United States Patent [19]
Miller, Jr. et al.

[11] Patent Number: 5,798,952
[45] Date of Patent: Aug. 25, 1998

[54] LEADING BIT ANTICIPATOR

[75] Inventors: Robert H. Miller, Jr., Loveland, Colo.; Rudolfo G. Beraha, Los Altos, Calif.

[73] Assignee: Hewlett-Packard Company, Palo Alto, Calif.

[21] Appl. No.: 608,798

[22] Filed: Feb. 29, 1996

[51] Int. Cl.[6] .................. G06F 7/00; G06F 7/38; G06F 7/50

[52] U.S. Cl. .................. 364/715.1; 364/784.01; 364/748.11

[58] Field of Search .................. 364/715.1, 748, 364/784, 748.01, 748.04, 748.05, 784.01, 715.11

[56] References Cited

PUBLICATIONS

E. Hokenek and RK Montoye; "Leading–Zero Anticipator (LZA) in the IBM RISC System/6000 Floating–Point Execution Unit"; IBM J Res. Develop. vol. 34, No. 1; Jan. 1990; pp. 71–77.

RK Montoye, et al.; "Design of the IBM RISC System/6000 Floating–Point Execution Unit"; IBM J. Res. Develop. vol. 34 No. 1; Jan. 1990; pp. 59–70.

*Primary Examiner*—Reba I. Elmore
*Assistant Examiner*—Robert J. Dolan
*Attorney, Agent, or Firm*—Edward L. Miller

[57] ABSTRACT

Improved and less complicated leading bit anticipation (LBA) for a PKG floating point adder of n-bit 2's complement operands is accomplished by representing de-normalized (n+1)-bit operands as (n+1)-many PKG symbols. These are grouped into (n−1)-many triples, each of which has two adjacent PKG symbols in common with its neighboring triple. Presuming the existence of a least significant PKG symbol of K allows the formation of an additional triple of lesser significance. Each triple produces an associated transition bit that when set indicates, for the partial summation segment of the raw sum of bit location corresponding to the location of the triple, if the left-most two bits of the corresponding partial summation segment are, or would be with a carry-in, of opposite bit values. The bit position of the most-significant set transition bit is determined in terms of how many bit positions J that is from the most significant transition bit position. The raw sum is normalized by shifting it left by J-many bit positions and adjusting its exponent by J. If J is one too low in value then the raw sum is shifted and its exponent is adjusted by one extra count. When no transition bits are set, the raw sum is zero. A raw sum of zero does not need normalization, although the zero case needs to cause a forced a zero for the exponent. If a slightly different rule is used for determining the transition bit of the MSB, then a simplification of the rule for producing transition bits for all remaining bit positions is possible. That simplification is that any triple whose center symbol is P can produce an associated transition bit of zero.

7 Claims, 7 Drawing Sheets

LEADING BIT ANTICIPATOR

BACKGROUND OF THE INVENTION

A high performance floating point binary adder is an important component of a modern microprocessor. Rather than rely on older brute force techniques, high performance adders often employ alternative approaches, such as PKG encoding. (PKG stands for Pass Kill Generate, and its origin is explained at an appropriate place below.) PKG encoding replaces two binary addends with bit-wise carry-out information which may be operated on in stages to very quickly produce the sum. The PKG representation of the addends requires more bits for representation than do the two original operands themselves, but there subsequently obtains a considerable advantage in the speed with which the sum can be found. An important part of a high performance floating point adder, whether of the PKG variety or otherwise, is an element called a "leading bit anticipator", or LBA.

As in all floating point operations, it frequently happens that the raw result needs to be normalized. That is, the significant bits of the sum need to be shifted to eliminate leading zeroes, (or, in the case of a two's complement number that is also negative, shifted to eliminate leading ones), and the exponent adjusted by a corresponding amount. If there were not an LBA, the raw sum would have to be inspected after it is formed in order to determine what steps are needed for normalization. It is not so much that this does not work, but it adds significantly to the time required to produce the final answer. What an LBA does is to determine what steps are needed for normalization, while the raw sum is being formed, so that as soon as that raw sum is produced it may be normalized immediately, without further inspection (and its attendant delay). The "what steps" referred to above include determining how many shifts are necessary to rid the result of leading bits, which is also the amount by which the exponent must be adjusted.

Conventional leading bit anticipators are rather complicated, and thus require many devices for their implementation. See, for example, the article at pages 59–70 of the January 1990 issue of the IBM JOURNAL OF RESEARCH AND DEVELOPMENT, (Vol. 34, No. 1). That article is entitled "Design of the IBM RISC System/6000 floating-point execution unit", and its authors are R. K. Montoye, E. Hokenek and S. L. Runyon. Another article that is of particular interest in the same issue of that journal is the one entitled "Leading-zero anticipator (LZA) in the IBM RISC System/6000 floating-point execution unit", E. Hokenek and R. K. Montoye.

It would be desirable if there were a way to take the mystery out of leading bit anticipation, and obtain an LBA that is less complicated and whose implementation and fabrication were easier to accomplish.

SUMMARY OF THE INVENTION

Improved and less complicated leading bit anticipation (LBA) for a PKG floating point adder may be accomplished by: (1) De-normalizing the n-bit original 2's complement operands into (n+1)-bit 2's complement representations; (2) Representing the de-normalized operands as (n+1)-many PKG symbols; (3) Grouping the PKG symbols into (n−1)-many triples, each of which has two adjacent PKG symbols in common with its neighboring triple; (4) Optionally presuming the existence of a least significant PKG symbol of K, thus allowing the formation of an additional triple of very least significance; (5) Using each triple to produce an associated transition bit that when set indicates, for the partial summation segment of the raw sum of bit location corresponding to the location of the triple, if the left-most two bits of the corresponding partial summation segment are, or would be with a carry-in, of opposite bit values; (6) Determining the bit position of the most-significant set transition bit in terms of how many bit positions J that is from the most significant transition bit position; (7) Normalizing the raw sum by shifting it left by J-many bit positions and adjusting its exponent by J; and, (8) Determining if J is one too low in value, and if it is, then shifting the raw sum and adjusting its exponent by one extra count. When the optional presumption of a least significant K is employed and no transition bits are set, the raw sum is zero. A raw sum does not need normalization, although the zero case needs to cause a forced zero for the exponent. If in (5) above a slightly different rule is used for the MSB, (MSB stands for Most Significant Bit) then a simplification of the rule for producing transition bits for all remaining bit positions is possible. That simplification is that any triple whose center symbol is P can produce an associated transition bit of zero.

DESCRIPTION OF A PREFERRED EMBODIMENT

Figure 1:
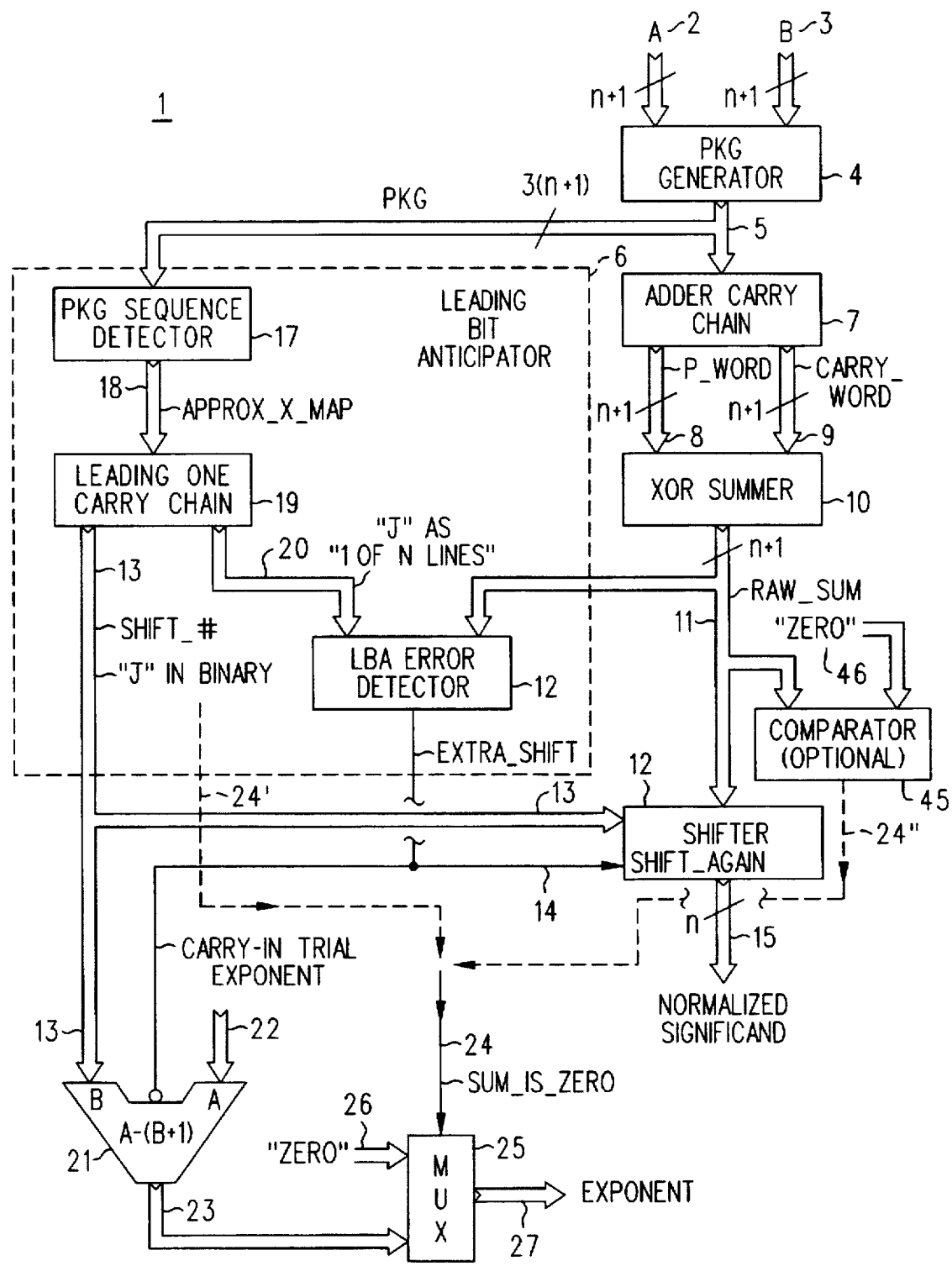
FIG. 1 is a simplified block diagram of an adder incorporating the improved leading bit anticipator (LBA)

Refer now to FIG. 1, wherein is shown a simplified block diagram 1 of a floating point addition circuit incorporating an improved leading bit anticipator 6 and that is suitable for implementation within an integrated circuit, such as a microprocessor. It will be understood that the block diagram 1 is exemplary. For example, we show it as operating on n-bit operands that have been previously been shifted into an (n+1)-bit representation (for overflow avoidance). In a preferred embodiment n=64, although n could be either a larger or smaller number of bits. These particular n-bit and (n+1)-bit operands, however, are in binary two's complement form. Our example employs an adder that uses PKG encoding, and while our LBA exploits PKG encoding, it will become clear that the PKG encoding needed by the LBA could be a part of the LBA only, and that the adder could be responsive directly to the unencoded binary addends.

At the risk of being unduly tutorial, but with a view toward the convenience of those who are less familiar with the 2's complement representation of integers, and to provide ready fodder for any examples a reader may wish to construct, we provide as a convenience the following table of the 2's complement numbers expressible in five bits:

| | | | |
|---|---|---|---|
| 0 = 00000 | 8 = 01000 | −1 = 11111 | −9 = 10111 |
| 1 = 00001 | 9 = 01001 | −2 = 11110 | −10 = 10110 |
| 2 = 00010 | 10 = 01010 | −3 = 11101 | −11 = 10101 |
| 3 = 00011 | 11 = 01011 | −4 = 11100 | −12 = 10100 |
| 4 = 00100 | 12 = 01100 | −5 = 11011 | −13 = 10011 |
| 5 = 00101 | 13 = 01101 | −6 = 11010 | −14 = 10010 |
| 6 = 00110 | 14 = 01110 | −7 = 11001 | −15 = 10001 |
| 7 = 00111 | 15 = 01111 | −8 = 11000 | −16 = 10000 |

To begin, then, note the two (n+1)-bit two's complement binary quantities A 2 and B 3. These represent the significant digit portions of two floating point numbers that are to be added. We shall call these significant digit portions "significands"; in other literature they are sometimes called the mantissa portion. Each of A 2 and B 3 has an associated exponent portion, which is not shown (together, a significand and its exponent make up a complete floating point number). These exponents will be combined in a known manner to produce a trial exponent 22 for the sum, which trial exponent 22 we shall encounter towards the end of this description of FIG. 1.

At an earlier stage in the processing (not shown) the two (n+1)-bit significands were each expressed in n bits, and each of their exponents was accordingly different. As part of the set-up for a floating point addition the two floating point operands were brought into alignment such that their respective bit positions correspond to the same powers of 2. This may require one of the operands to be de-normalized; that is, its significand gets shifted so that it exhibits underflow, and its exponent is adjusted accordingly. However, if the two operands were nearly equal in absolute value, no de-normalization might be needed to effect alignment, leading to the possibility that arithmetic combination will produce an overflow. As we shall see directly, overflow is bad news, and is best avoided, if at all possible.

Overflow in 2's complement arithmetic is serious business, and in the old days was detected by the exclusive OR (XOR) of the carry-outs of the two most significant bits. Such detection set a flag bit, say, OV. The value of the carry-out from the most significant bit was used to set a one-bit extension register, say, EX. The really bad thing about overflow is that, as the opposite of underflow, the way it is fixed is by shifting EX into the MSB while shifting that MSB and all the rest of the bits to the right (the direction of less significance). The way underflow is fixed is by shifting to the left, which is in the opposite direction. The two cases also require different directions of exponent adjustment, too. Therefore, overflow's special ugliness is that it produces the need to shift significands and adjust exponents in both directions.

The strategy of overflow avoidance is to ensure that, if there is not enough de-normalization during alignment to prevent overflow, something else will. That something else is to represent the larger n-bit operand in n+1 bits. This does not change its numerical value; it merely expresses it in a form that is capable of maintaining more bits before overflow occurs. Think of it as equivalent to re-writing 0.07 as 0.07. Now, if one of the operands is re-written into n+1 bits, then the other is, too. This is for the benefit of the bit-wise formulation of the PKG representation discussed below. In summary of this overflow avoidance strategy, we say that the operands are rewritten in n+1 bits and de-normalized as needed to effect both alignment and guarantee the absence of overflow. After the addition the result is normalized, as always, and is then re-written back in n bits. And while we are guaranteed that there will be no overflow, what we do get is an increased utilization of the normalization mechanism, in the sense that unless there would have been an overflow had we not gone to the extra bit of width, we have an underflow in the wider width representation. This additional need for normalization is not a problem; it would happen frequently, anyway, even without overflow avoidance. Similar remarks also apply to the corresponding adjustment of the exponent. That is, if overflow can be avoided, then so too can the need for adjusting the exponent in both directions. So, the price for getting rid of overflow and its ugly companion, bidirectional correction, is deliberate de-normalization ahead of time into a representation with n+1 bits.

The two (n+1)-bit input significands A 2 and B 3 are applied to a PKG generator 4. This is a known circuit that includes gating to produce from each pair of $A_i$ and $B_i$ one of a $P_i$, a $K_i$ or a $G_i$. For those who never knew, or that have forgotten, P stands for "propagate", K stands for "kill" and G for "generate", where these terms refer to a carry bit for each associated $i_{th}$ bit position. So, for applying two (n+1)-bit inputs to the PKG generator 4, the resulting output is a 3(n+1)-bit PKG word 5, which may be thought of as (n+1)-many PKG triples. For each bit position, P, K and G are generated according to the following definitions (where IFF means "if and only if"):

$K_i$=1 IFF $A_i$+$B_i$=0 (~$A_i$ AND ~$B_i$)
$P_i$=1 IFF $A_i$+$B_i$=1 ($A_i$ XOR $B_i$)
$G_i$=1 IFF $A_i$+$B_i$=2 ($A_i$ AND $B_i$)

In a preferred hardware embodiment each of $K_i$, $P_i$ and $G_i$ are represented as individual bits by a corresponding trio of mutually exclusive signals (e.g. a "one-of-three" representation) as opposed to encoding $P_i$, $K_i$ and $G_i$ with an $i_{th}$ pair of signals (ala "two bits can encode four symbols"). In principle, either way works, but there are well understood performance reasons for representing them individually, rather than encoding them.

The 3(n+1)-bit PKG word 5 is sent two places: to a leading bit anticipator (LBA) 6 and to an adder carry chain 7. Let us defer the discussion of the LBA 6 until all the rest of the stuff in FIG. 1 has been described, the better to appreciate the purpose and operation of that LBA 6. Accordingly, consider the adder carry chain 7. It produces an (n+1)-bit P_WORD 8 and an (n+1)-bit CARRY_WORD 9. The (n+1)-bit P_WORD 8 is simply all the various $P_i$ applied to the adder carry chain 7 by the PKG word 5. The CARRY_WORD 9 is created in a known fashion. For example, by a bit-wise application of the rule $C_i$=$G_i$ OR ($P_i$ AND $C_{i-1}$), where the $C_i$ are carry bits and $C_0$=$G_0$.

The P_WORD 8 and the CARRY_WORD 9 are applied to an XOR summer 10 whose output is RAW_SUM 11. RAW_SUM 11 is the un-normalized significand for the answer, and is obtained from a bit-wise XOR between a shifted-left-once CARRY_WORD and its (unshifted) companion P_WORD. This operation is accompanied by a zero carry-in at the least significant end and a (possible) most significant carry out at the other end, all of which are conventional details, that while present, are mostly only of background interest in our quest for a simpler LBA.

The RAW_SUM 11 is applied as a work input to a shifter 12. The shifter 12, which may be a barrel shifter, exists to normalize a significand that otherwise would appear to have an underflow condition: e.g., 0.00123 E9 needs to be made 1.23 E6, to give a decimal example. (Since our significands are in 2's complement binary, after normalization the leftmost pair of bits will always be "01" for a positive number, and "10" for a negative number, with the binary point between the second and third bits from the most significant end.) The shifter 12 has applied to it two inputs that indicate how much to shift the RAW_SUM 11. These inputs are: (1) SHIFT_#13, which is a binary number telling how many places to shift (except that it might be one too low in value); and (2) EXTRA_SHIFT 14, which is applied to an input of shifter 12 called SHIFT_AGAIN. We shall have more to say about where these signals come from when we discuss the LBA 6.

RAW_SUM 11 may be additionally applied to an optional comparator 45 which, if present, also receives at a comparison input an all 0's comparison value 46. The purpose of the comparator 45 is to determine if the raw sum is zero, and if so, produce a signal 24" to so indicate.

To continue, SHIFT_#13 is applied as a B input to an adder 21 whose other (A) input is the trial exponent 22. An inverted version of the signal 14 EXTRA_SHIFT is applied as a carry-in to the adder 21. The adder 21 performs A−(B+EXTRA_SHIFT), which is the computed exponent value of the overall answer and is what appears at the exponent output 27 of the adder 21, provided that the significand is not zero. As is well known concerning floating point summation, a significand of zero requires either ignoring the exponent or (much better) setting the exponent to a special value, which in this case is, for convenience and by convention, zero. The detection that the significand is zero may be accomplished in the LBA 6, and if so, is indicated by a signal 24' that serves as the source for another signal SUM_IS_ZERO 24. We shall see later how signal 24' may be produced. LBA 6 need not be the source for SUM_IS_ZERO 24; the source might alternatively be the signal 24" produced by the comparator 45.

The computed exponent 23 and a pre-encoded value of zero ("ZERO" 26) are applied as the two data inputs to a MUX 25. The MUX is controlled by SUM_IS_ZERO 24, and the appropriate one of the computed exponent 23 and "ZERO" 26 will appear as the exponent output 27 for the adder 21.

When taken together, the (adjusted) exponent 27 and the normalized significand 15 constitute the final sum of adding the original inputs (A 2 and B 3, each taken with its associated—but unshown—exponent).

As previously mentioned, it will become clear as the explanation proceeds that the main addition mechanism need not be of the sort that uses PKG encoding; it could, for example, be made of full adders directly connected to the input operands A 2 and B 3.

We turn now to a description and explanation of the leading bit anticipator (LBA) 6. Some of our initial remarks will apply to leading bit anticipators in general, whether they be leading one detectors or leading zero detectors, and regardless of their internal operation. The bulk of the explanation will be specific to the particular leading bit anticipator 6. We shall not offer a formal proof of the correctness of its operation. Instead, we will sketch a process of solution development that explains the idea underlying how the LBA 6 works, supplemented by some examples. Some rules of operation will be set out, and the overall concept will be illustrated by a table.

As mentioned earlier, the high level goal is to avoid having to wait for the main addition mechanism to produce the actual raw answer in order to inspect it and then normalize by shifting and exponent adjustment. Instead, we wish to quickly form a generally reliable approximation of the "normalization amount" (SHIFT_#13). We can then normalize the raw sum as soon as it is produced, without a full-blown inspection. This saves time.

There is a (believed to be well known) wart, however, and it has to do with the notion of "generally reliable approximation". It turns out that, unless we go to an amount of processing equivalent to the main adder itself (a self-defeating action), the approximation (which is a number) is sometimes correct, and sometimes off by one count. By understanding why this is so, and by making some appropriate choices, we can arrange that when the error does occur it is always in the same direction (say, one count too low), and we can devise a correction strategy for detecting when the error occurs and the easily adjust for it (by issuing EXTRA_SHIFT 14). The penalty for this correction strategy is still much less than the add-inspect-normalize approach that does not use a leading bit anticipator at all.

Now let's consider how the approximation of the normalization amount is arrived at. Suppose, simply as point of departure, that the plan were to produce an approximation of the raw sum, and then inspect it. The inspection is pretty much the same as it would be if the actual raw sum were at hand, so the gain in performance (savings in time) has to come from being able to get the approximate raw sum in much less time than is required for the actual raw sum. How might such an approximate raw sum be found? The PKG representation of the addends A 2 and B 3 would appear to contain the information we need. Suppose we take the symbols in the PKG word 5 one symbol at time, in an attempt to process them to produce another word APPROX_SUM. If we do this we are led immediately to the conclusion that this particular attempt is doomed. Regardless of whether P, K or G is the symbol for the $i_{th}$ bit location, the presence or absence of a carry-in for that location changes the value of the $i_{th}$ bit of the sum; we simply haven't got enough information with just one symbol.

The next attempt is to examine pairs of adjacent symbols in the PKG word 5. Now we begin to see some results, although not in every case. Consider the string KK for bits i and i−1. (We write down the bits of a number from left to right just as for other numbers, and consider bit zero to be on the far right.) In this case both bit positions sum to zero, and a carry in to the i−1 position will "get stuck" there, so that we can say with certainty that the $i_{th}$ position will be a zero. Unfortunately, there are still some ambiguous cases, such a PP for bits i and i−1, respectively. Here we don't know what to say about the $i_{th}$ position, except that it depends on the carry in to the i−1$_{th}$ position.

Before proceeding, consider that the present approach, if continued, also presumes that we would be prepared to examine the APPROX_SUM for strings of leading 1's, as well as for strings of leading 0's, depending upon whether the number is negative or positive, respectively. But positive or negative is indicated by the most significant bit, which in turn is affect by what is carried into it. Uncertainty about the sign of the sum is not comfortable. Also, it is not clear that we could avoid needing to have one set of hardware used to check for strings of leading 1's that is separate from a second set of hardware used to check for leading 0's.

A solution to the positive/negative concern is to dispense altogether with APPROX_SUM and adjust the PKG word inspection mechanism to output an approximation of the bit reversals in the raw sum. We shall call this approximation a "map" (as it really isn't a sum, any more), with the name APPROX_X_MAP, for "approximate transition map". A string of consecutive 0's in the map means that the corresponding bits in the actual raw sum are all the same (either 1's or 0's). A 1 in a bit location in the map means that the bit in the raw sum that is to the left of that location is different, or, said another way, that the present location represents a reversal. If having such a map can be arranged, our inspection can be simply detecting the left-most 1 in APPROX_X_MAP, without being bothered by whether the sum is positive or negative. What is "approximate" about this map is that a 1 in the map might indicate a location in the actual raw sum that is one bit location to the left of where the reversal actually occurs. This is the afore-mentioned "wart".

Thus fortified, let us investigate the notion of three-at-a-time inspection of symbols in the PKG word 5. Our plan will be to begin at the left (most significant part) of the PKG word 5 and enquire about the most significant triple of PKG symbols, and then precess across one symbol at a time while enquiring about consecutive triples of PKG symbols. Thus, from one triple to the next there will be two symbols of overlap (on the left) and one fresh symbol (on the right). Each time we inspect a triple we shall produce a value for a corresponding bit location in APPROX_X_MAP.

There are twenty-seven combinations that form the triples of interest: the left member of the triple can be any of three symbols (P, K or G), while the middle and right members of the triple can also be any of the same three symbols. As will be explained in connection with Table I below, any given triple tells us something of interest (bit value transitions) concerning the corresponding partial segment of the raw sum 11. However, for any case where the location of the triple in the overall word is such that there is at least one symbol to the right (which is the vast majority of the cases), we need to remember that there may or may not be a carry-in to the right hand member of the segment of the summation corresponding to the triple. The left-most, or most significant, triple will determine the most significant bit of APPROX_X_SUM, and so on in the direction of lesser significance. For original operands of n-bits, shifted into (n+1)-bits for overflow avoidance, there will be n−2 triples and a corresponding n−2 bit locations in APPROX_X_SUM. We shall see later in connection with FIG. 2 how it is that this, except for the LSB, is sufficient information to do leading bit detection on an (n+1)-bit raw sum.

Now consider the information set out in Table I. In connection with Table I and the explanations of the information depicted therein, we shall henceforth use the character "?" as a "don't care" or "wildcard" symbol, for which the binary values 1 or 0, or one of the symbols P, K and G, as appropriate, can be substituted.

TABLE I

| TRIPLE | RESULT | SUM W/O Cin | SUM W/Cin | RATIONALE |
|---|---|---|---|---|
| KKK | 0 | 000 | 001 | #1 |
| KKP | 1 | 001 | 010 | #2 |
| KKG | 1 | 010 | 011 | #4 |
| KPK | 1/0(MSB/~MSB) | 010 | 011 | #3 |
| KPP | 1/0(MSB/~MSB) | 011 | 100 | #3 |
| KPG | 1/0(MSB/~MSB) | 100 | 101 | #3 |

TABLE I-continued

| TRIPLE | RESULT | SUM W/O Cin | SUM W/Cin | RATIONALE |
|---|---|---|---|---|
| KGK | 1 | 100 | 101 | #4 |
| KGP | 1 | 101 | 110 | #2 |
| KGG | 0 | 110 | 111 | #1 |
| PKK | 1 | 100 | 101 | #4 |
| PKP | 1 | 101 | 110 | #2 |
| PKG | 0 | 111 | 000 | #1 |
| PPK | 0/1(~LSB/LSB) | 110 | 111 | #1, #5 |
| PPP | 0 | 111 | 000 | #1 |
| PPG | 0 | 000 | 001 | #1 |
| PGK | 0 | 000 | 001 | #1 |
| PGP | 1 | 001 | 010 | #2 |
| PGG | 1 | 010 | 011 | #4 |
| GKK | 0 | 000 | 001 | #1 |
| GKP | 1 | 001 | 010 | #2 |
| GKG | 1 | 010 | 011 | #4 |
| GPK | 1/0(MSB/~MSB) | 010 | 011 | #3 |
| GPP | 1/0(MSB/~MSB) | 011 | 100 | #3 |
| GPG | 1/0(MSB/~MSB) | 100 | 101 | #3 |
| GGK | 1 | 100 | 101 | #4 |
| GGP | 1 | 101 | 110 | #2 |
| GGG | 0 | 110 | 111 | #1 |

1 Must be a 0, since the left two bits of each partial sum exhibits no reversals.
2 Assign 1 to ?KP and ?GP, since each always has one partial sum with a reversal in the left two bits, and one without. This result will either be correct or one bit too significant.
3 KP? and GP? are don't care cases, since they occur to the right of ?KP and ?GP, which produce 1's. Assign 0 to these, as well as to any triple with P in the middle.
4 KKG, GGK, GKG, KGK, PKK and PGG are unambiguous reversals in the middle.
5 Distinguishes between a significand of minus one (all 1's) and zero (all 0's).

Table I is a listing of the twenty-seven possible PKG triples and their corresponding values for RESULT. RESULT is the value for the bit location in APPROX_X_MAP that corresponds to the instance of precession under consideration. That is, if this is the fifth instance of considering a triple, then RESULT supplies the fifth (counting from the left) bit of APPROX_X_MAP. Our explanation will begin with the MSB, which includes a rule that triples KPK, KPP, KPG, GPK, GPP and GPG are decoded as 1, as indicated by the notation "1/0(MSB/~MSB)" in the RESULT column. Note that each triple and its corresponding value of RESULT are accompanied by two different summation segments. These summation segments will be located at the bit positions of the raw sum 11 which correspond to the bit positions represented by the PKG triple's location, according to however much precession has occurred. These sums are the (only) possible summation segments that can occur, and are arrived at by considering the rules that are used to assign the symbols P, K and G in the first place, in conjunction with whether or not there is a carry-in to the right-hand side of the segment.

Now consider the (n+1)-bit raw sum 11, and recall the overflow avoidance scheme described earlier. Note also that a RESULT of 1 for the MSB of APPROX_X_MAP ought to mean that no underflow has occurred. Actually, we shall have to be content with one of these two cases: (1) There really was no underflow in the (n+1)-bit summation (implying that there would have been overflow in an n-bit summation); and (2) The indication of no underflow is false and the RESULT of 1 should have been a 0, with the next instance (one bit position to the right) of RESULT being the 1, instead. We shall call this second outcome an "LBA error". In all other cases where there is underflow RESULT must be 0.

A 2's complement sum that has neither underflow nor overflow starts out as 01? for positive numbers and as 10?

for negative numbers. Underflow is represented by cases where the sum starts out as either 00? (positive) or 11? (negative). The easiest place to begin an explanation of Table I is with how the RESULT's of 0 are justified. These will be the cases where there is no uncertainty about the occurrence of underflow.

These cases are found by inspecting the various summation segments that accompany the different triples in the table. Any triple that always produces only 000 or 111 for a summation segment must decode a 0 for the value of RESULT. There are two of these: PKG and PPP. Any triple that always produces only 000 or 001 for a summation segment must also decode a 0 for the value of RESULT. There are four of these: KKK, PPG, PGK and GKK. Finally, any triple that always produces only 111 or 110 for a summation segment must likewise decode a 0 for the value of RESULT. There are two of these: KGG and GGG. The reader is urged, as a useful exercise, to inspect the columns of summation segments and determine that these nine triples are indeed the only ones where, regardless of carry-in or not, underflow is assured. Those puppies must absolutely have a RESULT of 0!

We can easily find triples that absolutely and positively have to produce a RESULT of 1, also. To do this, look for triples whose only possible summation segments are of the form 01? or 10?. There are twelve of these: KKG, KPK, KPP, KPG, KGK, PKK, PGG, GKG, GPK, GPP, GPG and GGK. We can say that each of these cases represents an instance where the raw sum 11 does not exhibit underflow, and is thus also not an instance of LBA error.

Now we examine the remaining twelve triples, and note that these are all cases where each corresponding pair of partial summations segments has one segment that should produce a RESULT of 1 and another segment that should produce a RESULT of 0. What to do? We can't ignore the possible need to put out a RESULT of 1, even though we have no knowledge about the actual carry-in to those bits of the partial summation segment. The solution is to note that it is safe to put out a RESULT of 1, even if it should have been 0, since each such instance will indeed be an LBA error. The assertion is that an LBA error is not fatal, and will in due course be detected and fixed. That is, the assertion is that even if we form a RESULT of 1 that should have been a 0, the "ideal" next value of RESULT ought to have been a 1, anyway. (We don't say anything about what that the actual next value of RESULT is, only that we can spot and correct for when a RESULT of 1 happens one bit too soon.) Accordingly, observe from the table that triples KKP, PGP and GKP ought to produce a RESULT of 0 if there is no carry-in, while the carry-in case matches the no-underflow positive number case (RESULT should be 1). Similarly, observe that the triples KGP, PKP and GGP represent negative underflow with carry-in and no underflow without carry-in. However, the situation is indeed saved, since each of these instances is also an instance of LBA error. Note KKP, for example. Suppose the partial summation segment was indeed 001, the outcome for no carry-in. We output a RESULT of 1 (no underflow and no normaliztion), which is in error, since 001 ought to be normalized by shifting once to the left. Now, note carefully what this piece of information really is. We are saying that the three left-most bits of the raw sum 11 really are 001. So we would rightly expect that the next triple in the precession would indicate a summation segment of the form 01?, which is the beginning of the significant portion of a positive 2's complement number. Provided we can arrange to detect that an LBA error has occurred, all we need to do to fix it is normalize by one extra bit position. In this case that means an overall normalization of one shift, since we otherwise would not do any normalization, owing to the RESULT of 1 in the MSB of APPROX_X_MAP. On the other hand, if the partial summation segment for KKP were 010, then the RESULT of 1 for the MSB of APPROX_X_SUM is legitimate. In that case we need only ensure that the LBA error mechanism is not invoked. The remaining triples PGP, GKP, KGP, PKP, and GGP are each justified by a corresponding similar example. This concludes the explanation of setting the MSB of APPROX_X_SUM.

We turn now to the task of determining the remaining bits of APPROX_X_SUM. The easiest way to see what is going on is to analyze in the following way. Suppose that the preceding triple were for the MSB. Then we either have already put out a RESULT of 1 (whether for an LBA error, or not), in which case the analysis for the MSB case obtains, or, we output a RESULT of zero. A RESULT of 0 guarantees that underflow has occurred. That means that there are at least two consecutive 0's or two consecutive 1's at the far left of RAW_SUM 11. We really don't care which. The trick is to imagine discarding the left-most bit, precess by one triple and pretend to start over as if checking for the MSB all over again. (Almost—there is a minimization that depends upon knowing that it really is the interior that is being checked. This will be easy to see, shortly. Meanwhile, "drop" the left-most bit of RAW_SUM, precess the PKG triple by one and start over.) It should be clear upon some reflection that a string of left-most 1's or 0's can in this manner be discarded one at a time, since this corresponds exactly to what is going to happen to RAW_SUM 11 as soon as we get a chance to actually normalize it by shifting the significand to the left. Any queasiness about that can be cured by inspection of TABLE I. Every partial summation segment that includes 11? or 00? produces a RESULT of 0. So, if the truncated (by our imagined dropping) RAW_SUM has still got five 1's or five 0's to go before there is a bit reversal, we are absolutely guaranteed that there will be at least four more "fake MSB drops" (with at least four more 0's in the corresponding bit locations of APPROX_X_MAP) before we have to worry that we may encounter a RESULT of 1. This works, since if there are say, five 0's to go before a leading 1, then the next four precessions can't have associated partial summation segments other than 000. For if there were, there would be a 1 in that string of five 0's, which, by assumption, there is not. This means that the next four values of RESULT will be 0. The fifth value might be an LBA error, or not, since there are some partial summation segments that are of the form 001 or 110, although the earliest they are allowed to occur is at the end of the string of "drops".

A related way to summarize some of what is important here is as follows. Normalized positive numbers begin with a leading zero-one and normalized negative numbers with a leading one-zero. Positive numbers needing normalization will have a string of left-most zeros, while negative numbers needing normalization will have a string of left-most ones. Since a number is either positive (includes zero) or negative, there will be a left-most string of all 1's or of all 0's, and once we begin to examine a string of sign bits at the left, we need not worry as we precess to the right that we shall suddenly encounter a triple whose corresponding partial summation segment abruptly has an oppositely valued bit in its center or left position. It simply won't happen; the transition in bit value will occur "gradually" by first appearing at the far right of the corresponding partial summation segment.

Also, it should be clear that we need not physically shift or "drop" any bits at this point. The "precession" in the triples is sufficient. Furthermore, we need not consider the triples one at a time, or in any special order. This is because, once found, the triples are fixed, and their interpretation according to Table I is a function only of whether a triple is the for the MSB or not. Thus, all triples are independent and can be simultaneously decoded to produce all of the bits for APPROX_X_MAP in the same clock cycle. Thus, the notion of "precession" has merely been a convenient pedagogical device. After that single clock cycle the principal LBA issues remaining are the identification of the bit position of the left-most 1 in APPROX_X_MAP and the detection of LBA errors.

Before taking up those topics, however, we should address some residual issues relating to Table I. The first of these concerns the different values for RESULT based on whether or not we are enquiring about the MSB. Why the value of RESULT is 1 in those cases has already been explained; what needs explanation now is why it can be changed to a 0 for the consideration of non-MSB triples. It can be seen that the triples for which this is done are the six triples described by KP? and GP?. Once we know that they are not the MSB triple, we also know that they only occur to the right of ?KP and ?GP, respectively. But those six triples always have a RESULT of 1. Therefore, any value of RESULT to the right (in APPROX_X_MAP) of such a 1 will be of no consequence; it is a "don't care" value. If we set the value of RESULT to 0 for these triples we discover, by inspection of Table I, that a center symbol of P in a (non-MSB) triple is sufficient to indicate that its value for RESULT should be 0. This is a welcome simplification in the logic that decodes triples to produce values of RESULT.

Another topic we should investigate concerns the LSB of APPROX_X_MAP, and possible exceptional cases. Could, for example, APPROX_X_MAP receive all 0's, and if so, what would that mean? Also, we have indicated that there should be one bit of APPROX_X_MAP per triple. However, if the addends (after overflow avoidance) are each of n+1 bits, then there are (n+1)-many PKG symbols in the PKG word 5, which means that there are only n−1 triples. Does this means that an LBA operating on triples has insufficient "reach" to the right? An appreciation of this and other related issues may be gained by a study of FIG. 2.

Figure 2:
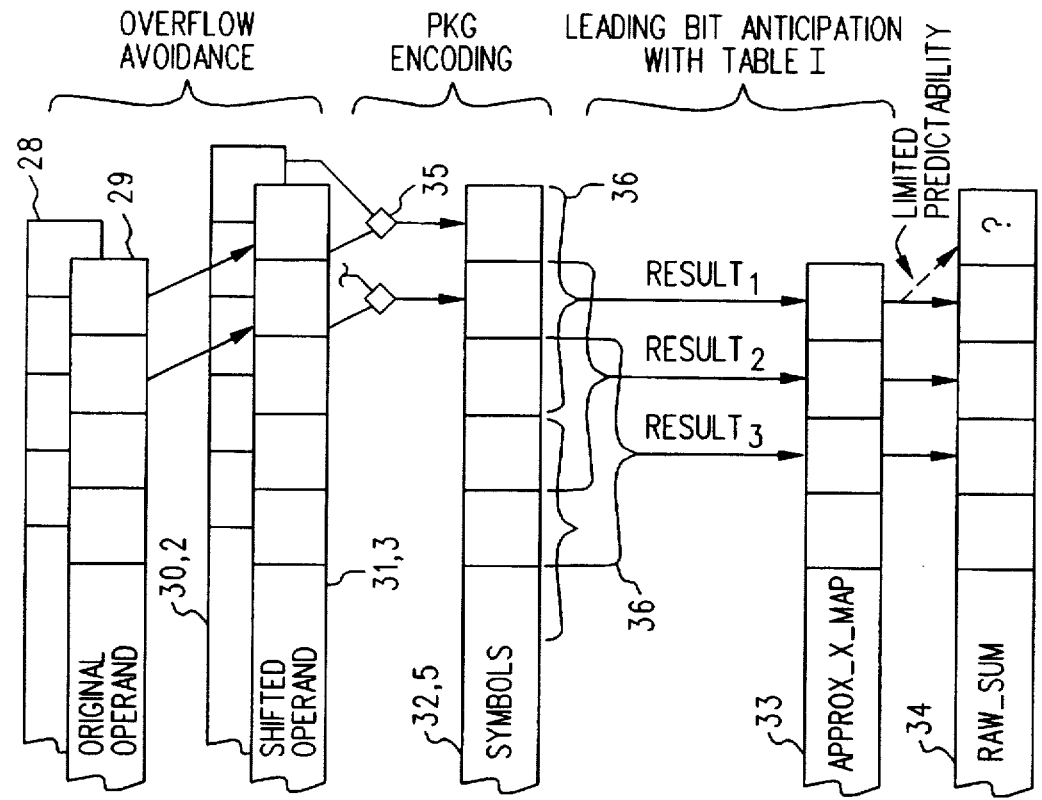
FIG. 2 is a diagram illustrating a correspondence between the bit locations for various constructs within the LBA, including the original operands, the operands as shifted to avoid overflow, the PKG representation of the shifted operands, a map of anticipated bit value transitions in the sum of the shifted operands (but that includes an inconvenient result for the LSB or least significant B), and the raw un-normalized sum.
Figure 2:
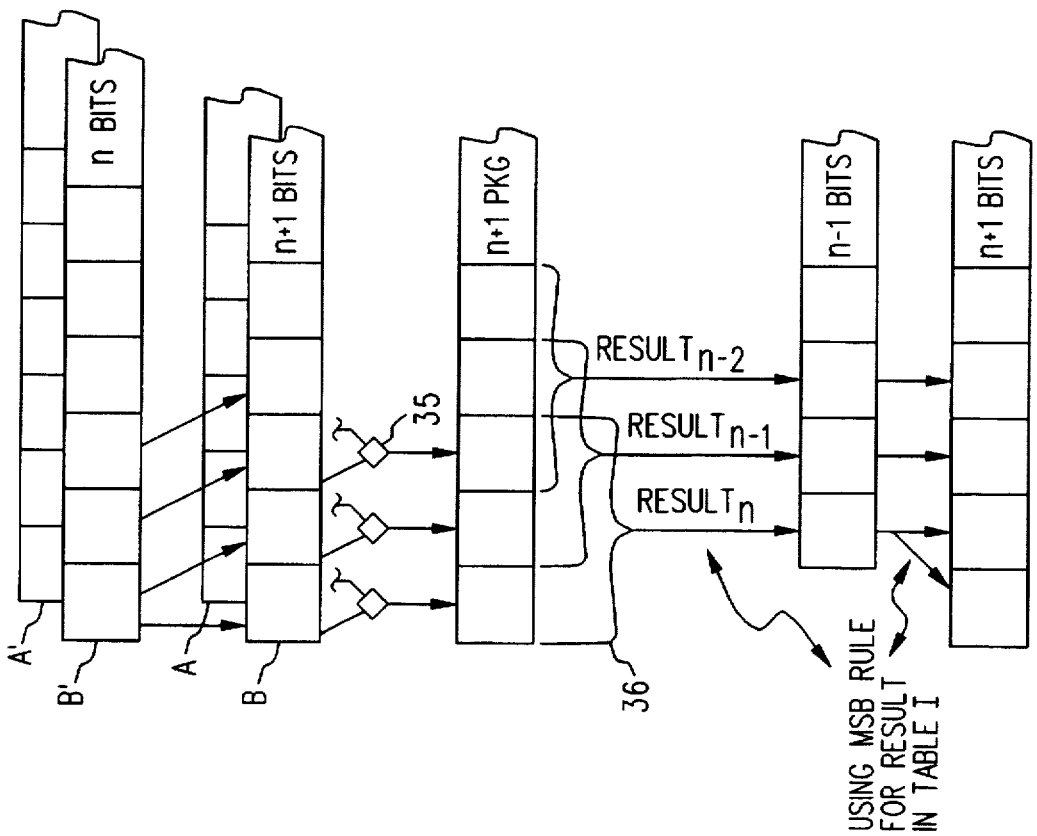

Refer now to FIG. 2, and note that it depicts five different stages in the processing of the bits of a 2's complement summation. At the very top of the figure are the two original n-bit operands, A' 28 and B' 29. For purposes of overflow avoidance these are arithmetically right shifted (arithmetic shifts preserve the sign bit) into respective shifted operands of n+1 bits: A (30, 2) and B (31, 3). From A' and B' are formed the n+1 PKG symbols (32, 5). The various diamonds 35 denote the rule for bit-wise generation of PKG symbols from a pair of binary operands. The PKG symbols (32, 5) are grouped into n−1 triples denoted by the various braces 36. Each triple produces, through the agency of gating (not shown in FIG. 2) that embodies the relationships set out in Table I, various $RESULT_i$ that we have labelled $RESULT_1$ through $RESULT_n$. The various $RESULT_i$ set the corresponding bit values in their respective n−1 bit locations in APPROX_X_MAP 33. Those n−1 bits of APPROX_X_MAP correspond to the n+1 bits of the eventual RAW_SUM 34 in the manner shown in the figure.

Finally, before appealing to FIG. 2 to explain certain cases of interest, we should point out that FIG. 2 is offered principally as a depiction of relationships between bit locations, the better to appreciate how the LBA works. We are not necessarily showing hardware connections between registers (although sometimes that can be safely inferred). In particular, the Figure is not a suggestion that APPROX_X_MAP 33 supplies bits for RAW_SUM 34; instead, a correspondence between those bits is what is depicted.

Now, suppose APPROX_X_MAP did contain all 0's, which is set out above as being a condition of interest. That ought to mean that the raw sum 11 contains no leading string of bits S followed by a bit reversal; i.e., the raw sum 11 is either all 1's or all 0's. We would like to make this statement with certainty, even though there are two less triples (or bits in APPROX_X_MAP 33) than there are bits in RAW_SUM 34. Unfortunately, there is not quite enough information about the LSB. At most, we can say that RAW_SUM 11 is either zero (all 0's), minus one (all 1's) or minus two (all 1's but for an LSB of 0). Perhaps if we appreciate the reason for this "inconvenience", we can decide what to do about it.

First, observe what a value of 0 for the single most significant bit of APPROX_X_MAP actually tells us about the two most significant bits of RAW_SUM 34: it says the sums needs to be normalized at least by one shift, so the leading bits of the sum must be either 11 or 00. If the sum starts out as 11 and has no bit value reversals (APPROX_X_MAP is all 0's, remember), then it must be 11111 . . ., with a similar argument for all 0's. This first observation gets us all 1's or all 0's down to just before the LSB of RAW_SUM 11. Second, observe also that a bit value of 0 in the LSB of APPROX_X_MAP is not quite sufficient to determine the LSB of RAW_SUM: it will be a 0 if the bit to its left is also a 0, but if that bit to the left is a 1 we don't know about the LSB. To see why this is so, we once again appeal to Table I, with the additional information that there will be no carry-in possible (how could there be one for the least significant triple?) and that the triples KP? and GP? will not occur (since by assumption there are no 1's to the left—recall that KP? and GP? only occur to the right of triples that do produce 1's).

Of the eight cases we are interested in (KKK, KGG, PPK, PPP, PPG, PGK, GKK and GGG), we note that for KKK, PPG, PGK and GKK the associated partial summation segments without carry-in are all 0's. That takes care of the case where the LSB is a 0 when the bit to the left is also a 0. PPP takes care of the all 1's case. Unfortunately, there are three black sheep: KGG, PPK and GGG. They each have an associated partial summation segment without carry-in that is 110. So here are cases where the bit to the left is a 1, but the LSB is a 0 (which forms a raw sum of minus two).

It would seem that this situation makes it possible for the LBA to report the case for a raw significand of minus one when it should report the case for minus two. Such misreporting could possibly result in normalization by an incorrect amount, and constitute an unacceptable arithmetic error.

Now, it should be pointed out that this does not mean that an embodiment operating in accordance with FIG. 2 is brain-dead or fatally flawed. There may be other external circumstances that remove, ahead of time, the ambiguity that is pointed out above, so that there is no chance that an arithmetic error can occur. One such arrangement occurs when the LBA is used in a floating point adder that is part of a larger multiply-accumulate unit. We need not dwell on the reasons why, but it can be shown that the error mechanism described above will not ever be invoked. An embodiment in accordance with FIG. 2 was, on the strength of just such an analysis, incorporated in product as part of a multiply-accumulate unit.

Nevertheless, it would be desirable if this inconvenient LBA confusion between unnormalized significands of minus one and minus two could be easily removed, so that the relatively simple technique of "precession" with triples of PKG symbols could be used in a stand-alone adder. It is easily done, as may be seen with reference to FIG. 3.

Figure 3:
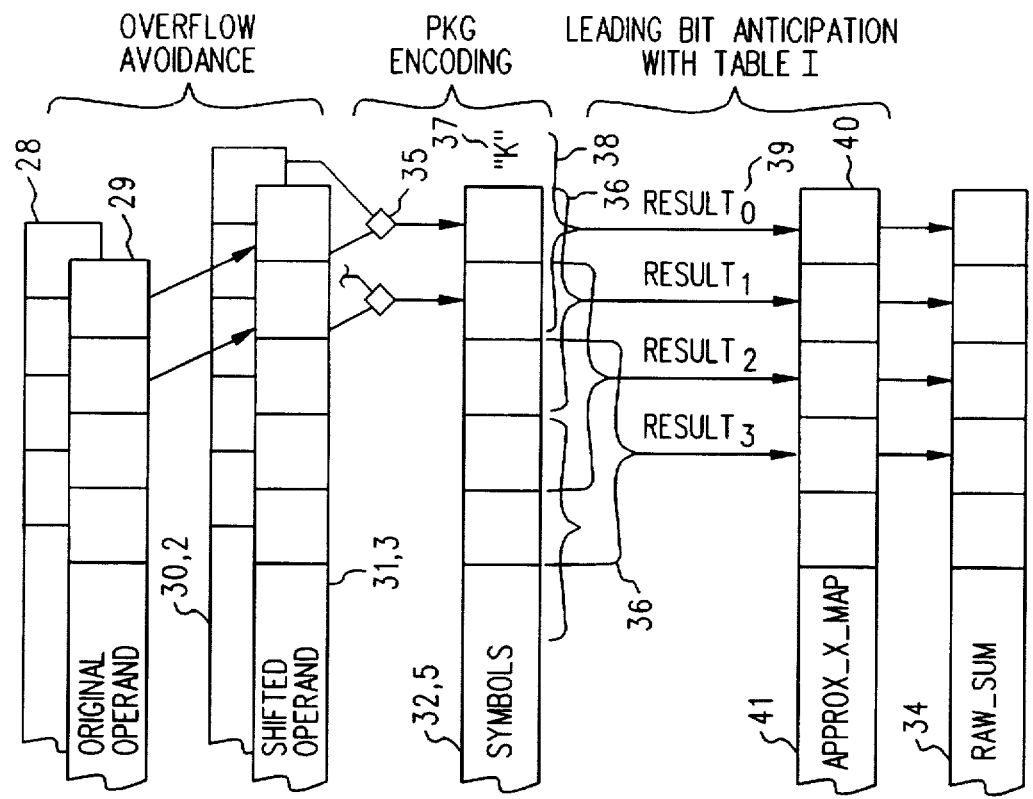
FIG. 3 is a diagram similar to that of FIG. 2, but including an additional least significant PKG symbol to assist in LBA operation when the raw sum is minus one, and to simplify LBA operation when the raw sum is zero.
Figure 3:
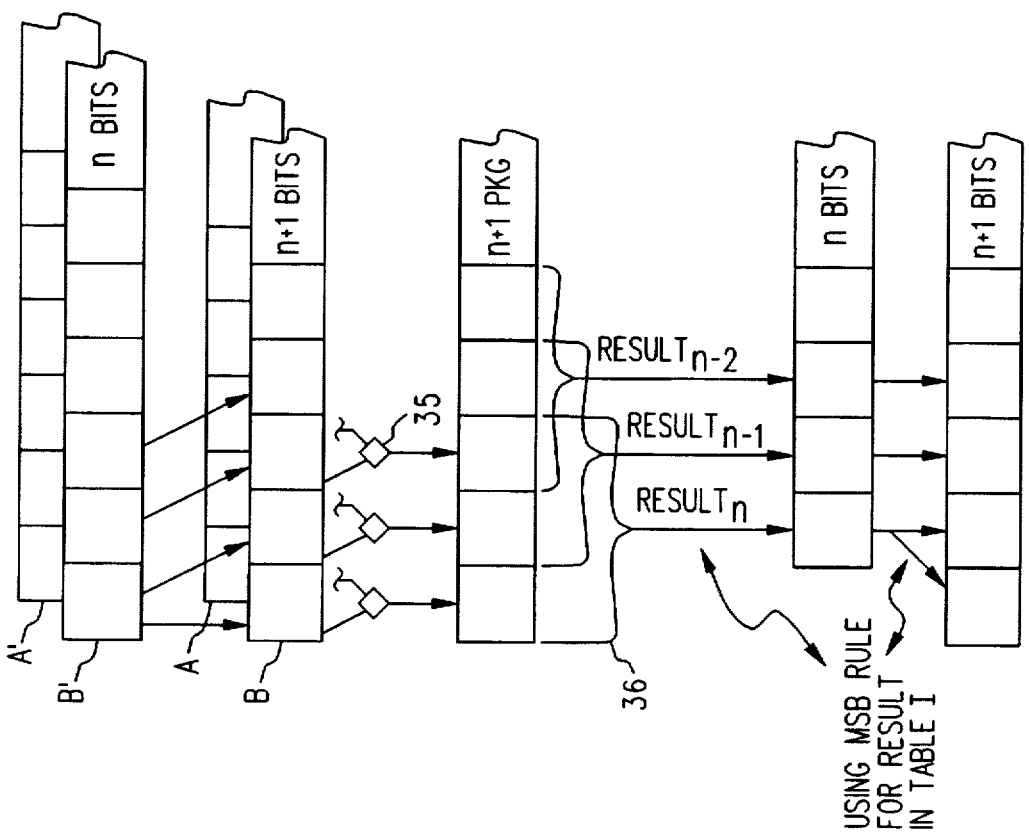

FIG. 3 is in many respects the same as FIG. 2. The difference is that in FIG. 3 we presume and exploit the existence of an additional least significant PKG symbol 37 whose value is "K". This allows the production of an additional least significant RESULT$_0$ 39 from the now least significant triple 38. Having (the extra) RESULT$_0$ allows another bit 40 of (a now expanded) APPROX_X_MAP 41 at the least significant end. That additional bit 40 of APPROX_X_MAP 41 is in correct correspondence with RAW_SUM 34. Now things work like they are supposed to.

We now consider why it is legitimate to presume that there is a K at the far least significant end of the PKG symbols. The basic idea is that, as far as the bit patterns that result are concerned, one can always take n-bit binary numbers to be added and simply append zeros on the right: the resulting bit pattern on the left (the original bits) will be unchanged. It is true that "momentarily" a negative number will not be "preserved", but 2's complement representations are simply an interpretation of the bits, and in any event, 2's complement numbers and unsigned binary integers are added bit for bit in the same way. Besides which, we do not in FIG. 3 keep the extra zero we add on the right; we forget about it just as soon as we have extra bit 40 of APPROX_X_MAP 41. Nor do we never change how the (n+1)-many bits of RAW_SUM 34 are found.

So, there is no problem in temporarily construing the de-normalized numbers A 30 and B 31 as having an extra low order bit of 0. And if they did, those 0's would produce a PKG symbol of K. That is where "K" 37 comes from. Now the normal "precession of the triples" and "dropping of the MSB" analysis presented initially works directly all the way down to the LSB of RAW_SUM 34.

Finally, now consider the Table I entry for PPK. The notation of 0/1(~LSB/LSB) assumes the use of the presumed extra K 37; otherwise the RESULT for PPK should be a 0. This special case exists in Table I to prevent APPROX_X_MAP from being all 0's when RAW_SUM 11 is minus one (all 1's). (PPK is the only triple ending in K that has a partial summation segment with no carry-in of 110—the 0 there is one to the left of the actual LSB in RAW_SUM.) By forcing a 1 into (the LSB of) APPROX_X_MAP we prevent a raw significand of minus one from appearing to need no normalization, and instead indicate an amount of normalization that is one count too low. That is, it will be an LBA error. That is okay, and will be detected and fixed just as always. The logic required to accomplish this is equivalent to the gate that produces RESULT$_0$ including a term that forces the output to 1 if the actual LSB symbol (i.e., the one having a subscript of 0) in the n+1 PKG symbols 32, 5 is P.

To refer again to FIG. 1, our discussion has now reached the point where it makes sense to describe the internal construction of the LBA 6. Consider the PKG sequence detector 17. The PKG sequence detector is merely bit-by-bit gating implementing Table I. This gating (or perhaps a look-up table) is connected on the input side to the PKG word 5 and its outputs are the bits of APPROX_X_MAP (33, 41). Those bits (the various RESULT$_i$) are applied to a leading one carry chain 19 that is simply a priority carry chain similar to what was described earlier for the adder carry chain 7. The carry chain finds a numbered bit position for the most significant 1 (if any) in APPROX_X_MAP; this number, say J, is a count of bit positions from the left. If J is zero, then the RAW_SUM 11 need not be normalized (although it needs to be truncated by having its right-most bit removed). Output 13 SHIFT_# is a binary encoding of the value for J. Output 20 is a "one of n-many lines" representation of the value of J, where "n-many" is the same number of bits as in the original operands (28, 29) if a FIG. 3 style embodiment is in use, and one less than that for a FIG. 2 style embodiment.

We may also note that if the LBA 6 is to be responsible for producing a signal 24' that is to be the source of SUM_IS_ZERO 24, then it may be produced by detecting with suitable gating that all of the RESULT$_i$ are 0's and that the MSB of RAW_SUM is also 0. Alternatively, comparator 45 could produce a signal 24" that could serve as the source for SUM_IS_ZERO 24 in the absence of signal 24' from LBA 6.

Figure 4:
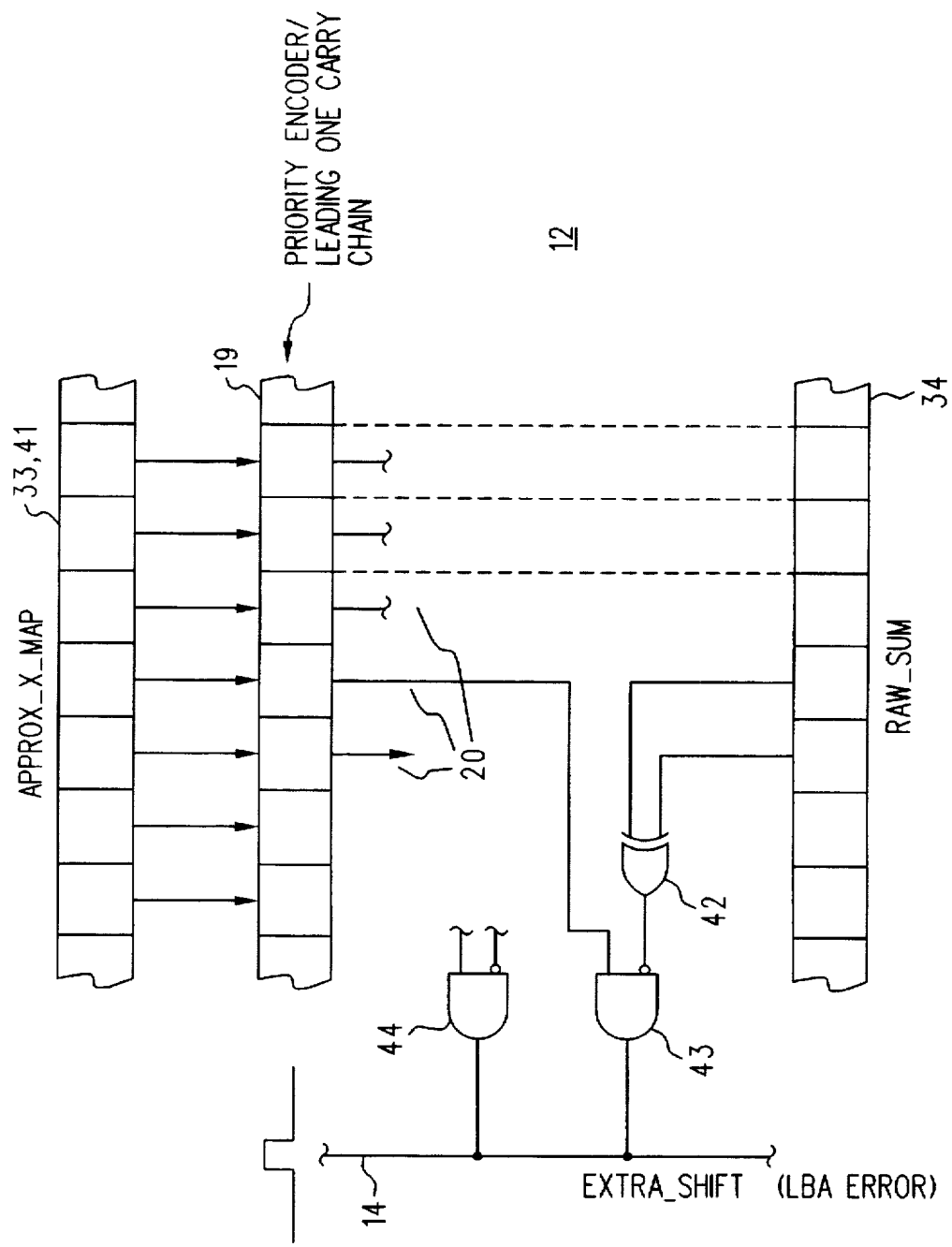
FIG. 4 is a partial block diagram indicating the nature of a type of error correction used in conjunction with the LBA of FIG. 1.

The operation of LBA error detector 12 may now also be appreciated with reference to FIG. 4. Shown therein are a segment of APPROX_X_MAP 33, 41 and of RAW_SUM 34, just as for FIGS. 2 and 3. The contents of APPROX-X-MAP are applied to the leading one carry chain 19, where the left-most bit is identified, and any ones to the right are suppressed. For each pair of adjacent bit positions in RAW_SUM 34, the bits of each such adjacent pair are applied to an exclusive OR gate 42. We show in FIG. 4 only one such XOR gate 42; it will be understood that there are as many instances of gate 42 as there are adjacent pairs of bits in RAW_SUM 34. The output of the XOR gate 42 is applied as one input to an associated AND gate 43, whose other input comes from the bit (20) of the leading one carry chain 19 that corresponds to the least significant bit of the bit pair of RAW_SUM going to the XOR gate 42. There is likewise one instance of AND gate 43 for each adjacent pair of bits in RAW_SUM 34, although only one other such AND gate is shown as gate 44. The wired OR of all of the outputs of the various gates 43 (44) is the signal EXTRA_SHIFT 14, mentioned earlier, which signifies the occurrence of an LBA error. It is not hard to see what is going on. If a given bit position in APPROX_X_MAP is the left-most that is set, then the normal expectation is that the corresponding bit position in RAW_SUM and its predecessor are different in value. The absence of that condition is an LBA error, and will cause the output of one of the various AND gates 43 (44) to go TRUE.

Here is a symbolic description of the internal operation of the leading one carry chain 19. In terms of the embodiment shown in FIG. 3, the priority carry chain propagates a carry $C_i$ from an MSB of subscript n to an LSB of subscript 0, according to these rules:

$C_n = 0$, $C_{i-1} = (C_i)$ OR (APPROX_X_MAP$_i$), and
$J_i = $ (APPROX_X_MAP$_i$) AND (~$C_i$)

Figure 5:
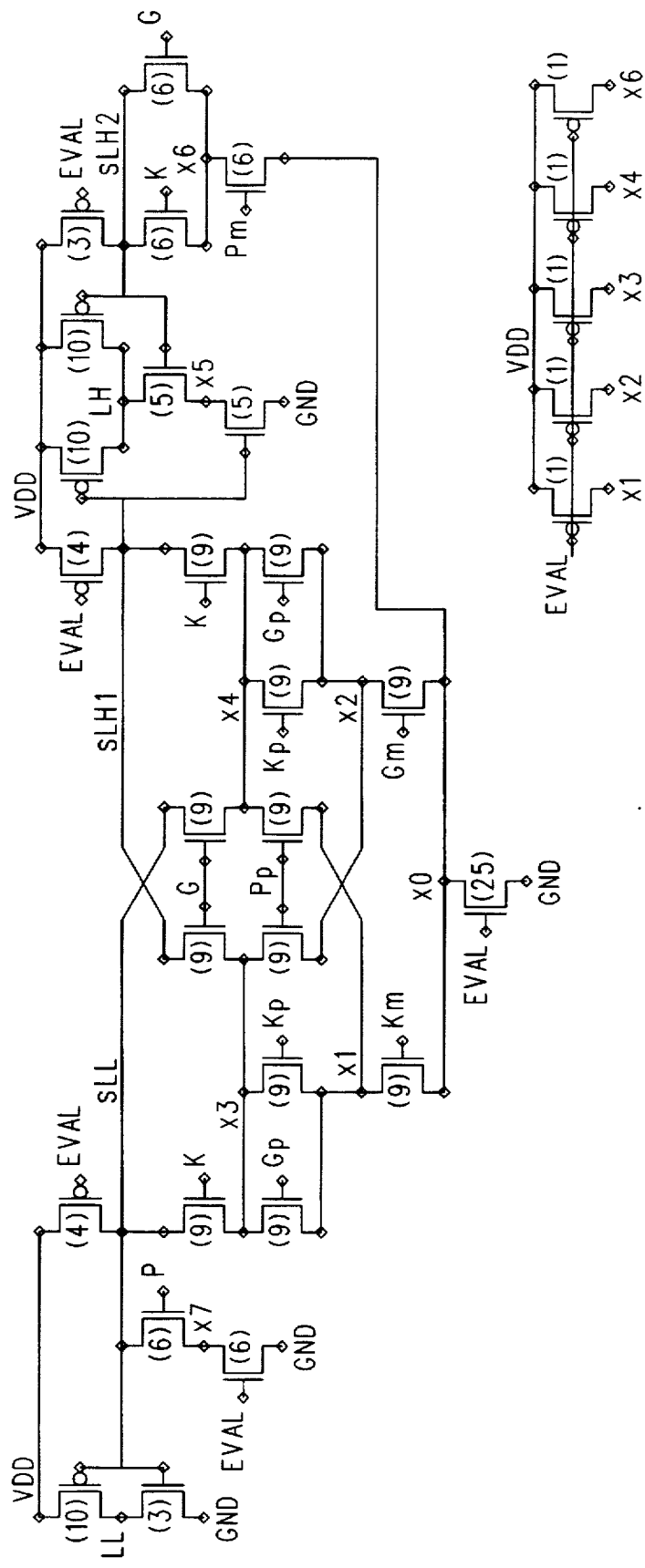
FIG. 5 is a CMOS (Complementary Metal Oxide Semiconductor) schematic segment of a gating cell usable in implementing a table of relationships between non-MSB triples of PKG symbols and a resulting word whose leading bit is indicative of how much normalization is required.

Refer now to FIG. 5, which is a schematic of a CMOS gating cell that was used in one actual embodiment to implement all but the MSB portion of Table I. We shall describe the notational conventions used in the schematic, after which the reader skilled in the art of CMOS will on his own be able to appreciate how the schematic implements the non-MSB portion of Table I. The outputs are labelled LH and LL, which stand for LEADING_BIT HIGH and LEADING_BIT LOW. The style of electrical logic in use allows complementary signals: —H and —L. The LEADING_BIT signal (LH and LL) exits once per triple, and corresponds to what we earlier called the various RESULT$_i$. Now as to the inputs. Observe the single symbols P, K and G. These denote non-complementary signals that correspond to the $i_{th}$ position in the PKG word 5. That $i_{th}$ position will contain a single symbol that will be one of P, K or G. The symbol pairs of the form Pp, Kp, . . ., denote $P_{i+1}$, $K_{i+1}$, . . .; the lower case p in Pp was a device to cope with a computer aided IC design tool that is unduly fussy about what ASCII characters it allows as labels. The lower case p stands for "plus", as in "to the left of" along an ordinary axis. Similarly, in Pm, Km and Gm the lower case m stands for "minus" (to the right of) and is to be interpreted as the subscript i−1.

Recall that relationships depicted in Table I are different for six triples if the triple is for the MSB. Certainly a designer of ordinary skill in the art could produce a gating cell similar to the one shown in FIG. 5 to implement the MSB case. Whether or not to do so, however, may depend upon a variety of factors, including the number of permissible gate delays, available space on the chip, and simple personal inclination. For there is another way, which we will now describe using FIGS. 6 and 7.

Figure 6:
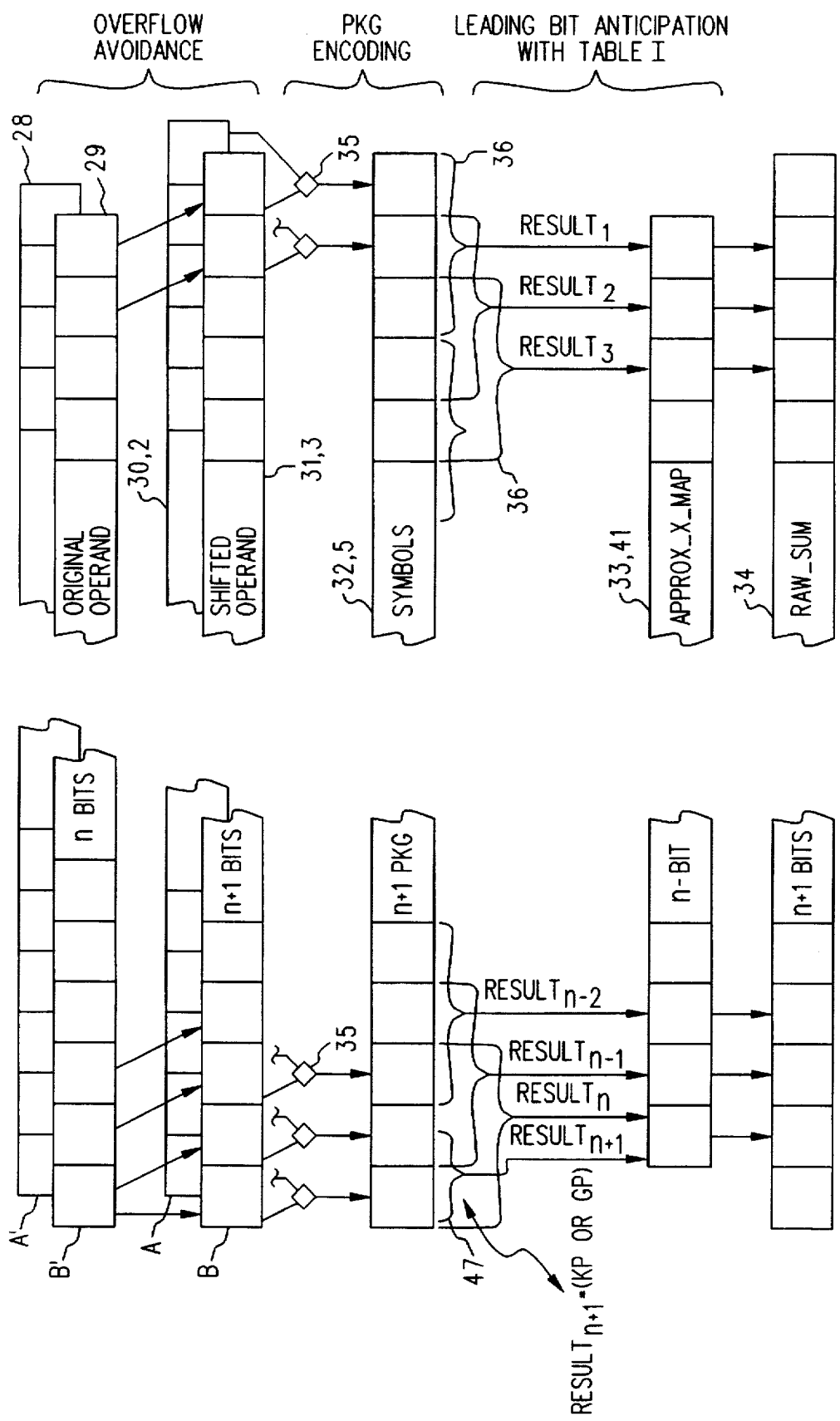
FIG. 6 is a diagram similar to that of FIGS. 2 and 3, illustrating decoding of an MSB pair of PKG symbols to determine the MSB of the word whose leading bit is indicative of how much normalization is required.

Refer now to FIG. 6, which is a diagram much like those of FIGS. 2 and 3, except that it is different in connection with the most significant pair 47 of PKG symbols 32, 5 and the MSB of APPROX_X_MAP 33, 41. In particular, the most significant bit of APPROX_X_MAP 33, 41 can now be set by either $RESULT_n$ or $RESULT_{n+1}$. $RESULT_{n+1}$ is produced by an extra most significant pair 47 of PKG symbols, according to the relationship $RESULT_{n+1}$=(KP or GP). This works because, by inspection of Table I, it is any KP (?KP) or any GP (?GP) that, in the MSB case, should produce a RESULT of 1.

Figure 7:
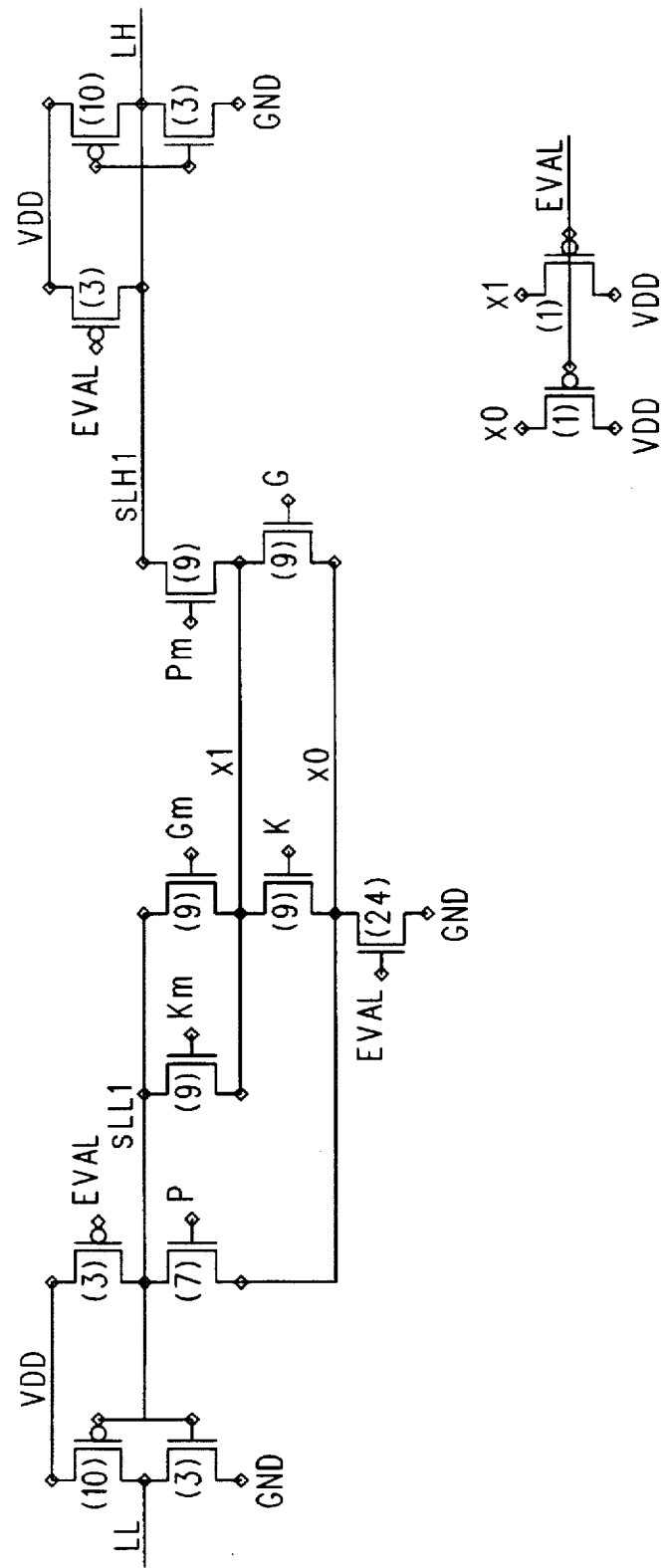
FIG. 7 is a CMOS schematic segment of a gating cell usable in connection with the MSB scheme of FIG. 6.

FIG. 7 is a schematic segment of a CMOS gating cell that implements the relationship $RESULT_{n+1}$=(KP or GP). The same notational conventions apply to FIG. 7 as were described for FIG. 5.

We claim:

1. A method of anticipating the bit position of the leading significant bit of a 2's complement binary sum of two n-bit original operands, the method comprising the steps of:

(a) de-normalizing the two n-bit original operands into two (n+1)-bit representations;

(b) generating for each $i_{th}$ bit position in the two (n+1)-bit representations an $i_{th}$ symbol, each such symbol being one of a first, second or third symbol value, the first symbol value corresponding to the respective $i_{th}$ bits of the two (n+1)-bit representations summing to zero, the second symbol value corresponding to a sum of one, and the third symbol value corresponding to a sum of two, the (n+1)-many symbols so generated forming an ordered sequence of symbols;

(c) grouping the (n+1)-many symbols into (n−1)-many ordered triples, each triple having two adjacent symbols in common with an adjacent triple in the ordering thereof;

(d) inspecting triples to produce a corresponding transition bit in a binary transition word of at least as many transition bits as there are triples, the transition bits being ordered to be in correspondence with the ordering of the triples, a production of a first transition value of the transition bit indicating that the partial summation segment of the bit locations of the de-normalized operands corresponding to the triple being inspected has two most significant bits that are, or would be with a carry in, of opposite bit values, and a production of a second transition value of the transition bit indicating otherwise;

(e) determining by inspection of the binary transition word the bit position therein, if any, of the most significant bit of the first transition value;

(f) expressing the bit position determined in step (e) as a number J, where J is how many bit positions from the most significant end of the binary transition word the determined bit position is;

(g) adding the two (n+1)-bit representations to form a raw sum; and (h) normalizing the raw sum by an amount equal to J.

2. A method as in claim 1 further comprising a step (k) wherein if the first symbol value is denoted as K, the second symbol value is denoted as P and the third symbol value is denoted a G, then when any of the six triples KPK, KPP, KPG, GPK, GPP or GPG is associated with the most significant bits of the n-bit original operands step (k) produces for such a triple the first transition value for the associated transition bit, and when any of those six triples is associated with bits of the n-bit original operands that are not most significant bits step (k) produces for the associated transition bit the second transition value.

3. A method as in claim 1 further comprising the steps of:

(i) determining that J is one too low in value; and (j) shifting the raw sum by an additional shift separate from shifting corresponding to the value of J.

4. A method as in claim 3 wherein the original operands are significands of respective floating point numbers having exponents and further comprising the step of diminishing the numerical value of a trial exponent for the binary sum by the numerical amount J+1.

5. A method as in claim 3 wherein step (i) comprises the steps of forming an ordered plurality of exclusive OR signals, the ordering corresponding to successive pairs of adjacent bits in the raw sum, beginning with the MSB thereof, selecting the Jth exclusive OR signal in the ordering thereof, and determining that J is one too low in value according to the Jth exclusive OR signal being false.

6. A method as in claim 1 further comprising the step of forming an additional and least significant triple in the ordering thereof from the least two significant symbols generated in step (b) and a symbol of the first symbol value presumed to be located at a bit position one bit less significant than the actual least significant bit of the two (n+1)-bit representations.

7. A method as in claim 6 further comprising a step (l) wherein if the first symbol value is denoted as K, the second symbol value is denoted as P and the third symbol value is denoted a G, then when the triple PPK is associated with the least significant bits of the n-bit original operands step (l) produces for that triple the first transition value for the associated transition bit, and when that triple is associated with bits of the n-bit original operands that are not least significant bits step (l) produces for the associated transition bit the second transition value.

\* \* \* \* \*